(12) United States Patent
Ming et al.

(10) Patent No.: US 10,604,686 B2
(45) Date of Patent: *Mar. 31, 2020

(54) SECONDARY BATTERY AND METHOD FOR MANUFACTURING THE SAME (71) Applicant: Dongguan Amperex Technology Limited, Dongguan (CN)

(72) Inventors: Bangsheng Ming, Dongguan (CN); Deqiang Zhao, Dongguan (CN); Wei Gao, Dongguan (CN); Ying Wang, Dongguan (CN); Chunjiang Xiang, Dongguan (CN); Shaoyu Chen, Dongguan (CN)

(73) Assignee: Dongguan Amperex Technology Limited, Dongguan (CN)

( * ) Notice: Subject to any disclaimer, the term of this patent is extended or adjusted under 35 U.S.C. 154(b) by 350 days.

This patent is subject to a terminal disclaimer.

(21) Appl. No.: 15/246,737

(22) Filed: Aug. 25, 2016

(65) Prior Publication Data

US 2017/0288279 A1 Oct. 5, 2017

(30) Foreign Application Priority Data

Mar. 31, 2016 (CN) .......................... 2016 1 0200577

(51) Int. Cl.
*C09J 163/00* (2006.01)
*H01M 2/00* (2006.01)
(Continued)

(52) U.S. Cl.
CPC ........ *C09J 163/00* (2013.01); *C08G 18/4238* (2013.01); *C08G 18/4825* (2013.01);
(Continued)

(58) Field of Classification Search
None
See application file for complete search history.

(56) References Cited

U.S. PATENT DOCUMENTS

2006/0093896 A1* 5/2006 Hong ...................... H01M 2/34
429/61
2013/0209846 A1* 8/2013 Lev ........................ H01M 10/48
429/90
(Continued)

FOREIGN PATENT DOCUMENTS

CN 1319914 A 10/2001
CN 2605670 Y 3/2004
(Continued)

OTHER PUBLICATIONS

Chinese Office Action dated Dec. 8, 2017, in connection with corresponding Chinese Application No. 2016102005776 (13 pgs.).
(Continued)

*Primary Examiner* — Tracy M Dove
(74) *Attorney, Agent, or Firm* — Maier & Maier, PLLC (57) ABSTRACT

The embodiment of the present application relates to the field of Li-ion battery and, in particular, to a secondary battery. The secondary battery includes a cell, a safety component fixed on the cell and thermal conductive adhesive provided between the cell and the safety component, the thermal conductive adhesive contains at least one of hot melt adhesive, silica gel binder or epoxy resin binder, and thermal conductive filling material. The thermal conductive adhesive in the secondary battery performs good thermal conductivity and adhering property, which can stably adhere the safety component with the cell, meanwhile transferring, via the thermal conductive adhesive, heat of the cell to the safety component rapidly, so that the safety component cuts off the circuit to protect the cell during overcharge, thereby avoid situations that the thermal conductive adhesive is separated from the cell due to cell inflation and deformation.

8 Claims, 3 Drawing Sheets

(51) Int. Cl.

| | |
|---|---|
| *C09J 11/04* | (2006.01) |
| *C09K 5/14* | (2006.01) |
| *C09J 123/08* | (2006.01) |
| *C09J 123/06* | (2006.01) |
| *C09J 9/00* | (2006.01) |
| *C09J 1/00* | (2006.01) |
| *C08G 18/76* | (2006.01) |
| *H01M 2/34* | (2006.01) |
| *C08G 18/73* | (2006.01) |
| *C08G 18/42* | (2006.01) |
| *C08G 18/48* | (2006.01) |
| *C09J 175/04* | (2006.01) |
| *C09J 177/12* | (2006.01) |
| *C09J 153/02* | (2006.01) |
| *C08K 3/22* | (2006.01) |
| *C08K 3/04* | (2006.01) |
| *C08K 3/34* | (2006.01) |
| *C08K 3/08* | (2006.01) |
| *C08K 3/38* | (2006.01) |
| *C08K 3/28* | (2006.01) |
| *C08K 3/36* | (2006.01) |
| *C09J 177/00* | (2006.01) |
| *C08K 3/02* | (2006.01) |

(52) U.S. Cl.
CPC ......... *C08G 18/73* (2013.01); *C08G 18/7621* (2013.01); *C08G 18/7664* (2013.01); *C08G 18/7671* (2013.01); *C09J 1/00* (2013.01); *C09J 9/00* (2013.01); *C09J 11/04* (2013.01); *C09J 123/06* (2013.01); *C09J 123/0853* (2013.01); *C09J 175/04* (2013.01); *C09K 5/14* (2013.01); *H01M 2/348* (2013.01); *C08G 2170/20* (2013.01); *C08K 3/04* (2013.01); *C08K 3/08* (2013.01); *C08K 3/22* (2013.01); *C08K 3/28* (2013.01); *C08K 3/34* (2013.01); *C08K 3/36* (2013.01); *C08K 3/38* (2013.01); *C08K 2003/023* (2013.01); *C08K 2003/0806* (2013.01); *C08K 2003/222* (2013.01); *C08K 2003/2227* (2013.01); *C08K 2003/2231* (2013.01); *C08K 2003/382* (2013.01); *C08K 2003/385* (2013.01); *C09J 153/02* (2013.01); *C09J 177/00* (2013.01); *C09J 177/12* (2013.01); *H01M 2200/10* (2013.01); *H01M 2200/103* (2013.01); *H01M 2200/106* (2013.01)

(56) References Cited

U.S. PATENT DOCUMENTS

| | | | | |
|---|---|---|---|---|
| 2014/0205895 | A1* | 7/2014 | Kim | H01M 2/0404 429/179 |
| 2017/0288278 | A1* | 10/2017 | Ming | H01M 2/0295 |
| 2017/0362473 | A1* | 12/2017 | Butterbach | C09J 11/04 |

FOREIGN PATENT DOCUMENTS

| | | |
|---|---|---|
| CN | 202871923 U | 4/2013 |
| CN | 203013875 U | 6/2013 |
| CN | 103555262 A | 2/2014 |
| CN | 204088489 U | 1/2015 |

OTHER PUBLICATIONS

Office Action dated May 2, 2018 in corresponding Chinese Application No. 201610200577.6; 12 pages including English-language translation.

\* cited by examiner

SECONDARY BATTERY AND METHOD FOR MANUFACTURING THE SAME

TECHNICAL FIELD

The present application relates to the field of Li-ion battery and, in particular, to a secondary battery containing thermal conductive adhesive and a method for manufacturing the same.

BACKGROUND

Li-ion battery has advantages such as high energy density, long cycle service life, environmental friendly and reproducible etc., which has been widely applied to various kinds of consumer electronic products. However, since the chemical systems of different Li-ion batteries are not the same, safety performance in abuse, in particular overcharge, becomes a great challenge of Li-ion battery. At present, the commonly adopted measure for improving safety performance in abuse is to connect an external protection device, such measure can significantly improve the safety performance of the Li-ion battery in abuse.

Currently, Li-ion battery for commercial use is generally welded with temperature fuse, circuit breaker, PTC and so on outside the battery as the safety protection device, when heat is generated due to abuse of the battery and then the temperature increases, the heat of the battery main body will be conducted to the temperature fuse, when the temperature is higher than the triggering temperature of the temperature fuse, the fuse will open and cut off the circuit, so as to guarantee safety of the battery.

Now in the market, the battery is mainly adhered by double faced adhesive tape, which performs poor thermal conductivity and insufficient adhesion. The present application is aiming at the defects and disadvantages existed in the prior art.

SUMMARY

A primary object of the present application is to provide a secondary battery containing thermal conductive adhesive.

A secondary object of the present application is to provide a method for preparing the secondary battery.

In order to achieve the objects of the present application, the technical solutions adopted are:

The present application relates to a secondary battery, including a cell, a safety component fixed on the cell and thermal conductive adhesive provided between the cell and the safety component, the thermal conductive adhesive contains at least one of hot melt adhesive, silica gel binder or epoxy resin binder, and further contains thermal conductive filling material.

Preferably, the thermal conductive filling material is selected from at least one of metal, metallic oxide, carbon material, nitride, carbide, silicon material.

Preferably, the metal is selected from at least one of silver, copper or tin.

Preferably, the metallic oxide is selected from at least one of aluminium oxide, magnesium oxide, zinc oxide, titanium oxide, $SnO_y$, $0<y<=2$.

Preferably, the carbon material is selected from at least one of hard carbon, soft carbon, mesocarbon microbead, carbon nano tube, graphite, graphene.

Preferably, the nitride is selected from at least one of silicon nitride, aluminium nitride, boron nitride, titanium nitride.

Preferably, the carbide is selected from at least one of silicon carbide, tungsten carbide.

Preferably, the silicon material is selected from at least one of Si, $SiO_x$, $0<x<=2$.

Preferably, thermal conductive coefficient of the thermal conductive filling material is 1 W/mK~10000 W/mK, preferably 20 W/mK~6000 W/mK.

Preferably, particle size of the thermal conductive filling material is 1 nm~100 μm, or, the thermal conductive filling material contains thermal conductive filling material particle with particle size larger than 1 nm but smaller than 1 μm, and thermal conductive filling material particle with particle size larger than 1 μm but smaller than 50 μm.

Preferably, the thermal conductive filling material occupies 1%~99% weight of the thermal conductive adhesive, preferably 20%~75%.

Preferably, the hot melt adhesive is selected from at least one of polyurethane hot melt adhesive, EVA hot melt adhesive, polyamide hot melt adhesive, polyurethane hot melt adhesive, polyester hot melt adhesive, polyethylene hot melt adhesive, polyesteramide hot melt adhesive, styrene type thermoplastic elastomer; preferably, the polyurethane hot melt adhesive is selected from isocyanate polyurethane prepolymer; preferably, the styrene type thermoplastic elastomer is selected from styrene-butadiene-styrene block copolymer, styrene-isoprene-styrene block copolymer;

the silica gel binder is selected from silica gel;

the epoxy resin binder contains epoxy resin.

Preferably, the thermal conductive adhesive further contains at least one of tackifier, antioxygen, viscosity modifier.

Preferably, melt viscosity of the thermal conductive adhesive is 1000~1*10⁶ CPs, initial viscosity is 0.5~100N, peeling strength is 0.1~20N/3 mm, melting temperature is 120° C.~190V, thermal conductive coefficient is 0.1~10000 W/mK; preferably, the melt viscosity of the thermal conductive adhesive is 1000~20000 CPs, the initial viscosity is 0.5~60N, peeling strength is 0.5~10N/3 mm, melting temperature is 150° C.~190, thermal conductive coefficient is 0.1~100 W/mK.

Preferably, area of the thermal conductive adhesive is 1 mm²~500 mm², thickness of the thermal conductive adhesive is 0.01 mm~10 mm.

The present application further relates to a method for preparing the secondary battery, including: adding the thermal conductive adhesive on the safety component or the cell, applying a force of 0.1~100N so that the safety component is tightly adhered with the cell.

The beneficial effect achieved by the present application is:

1. The secondary battery of the present application, through adding thermal conductive filling material in the adhesive so as to prepare thermal conductive adhesive with good thermal conductivity, preferably, the thermal conductive coefficient is within the range of 0.1~100 W/mK, so that the heat in the cell is transferred to the safety component to keep its temperature the same with that of in the cell and that the circuit is cut off rapidly so as to protect the cell, and improve the safety performance during overcharge.

2. The thermal conductive adhesive of the secondary battery of the present application has good initial viscosity, based on the good viscosity, the safety component is well connected with the cell, thereby avoid situations that the thermal conductive adhesive is separated from the cell due to inflation and deformation of the cell in abuse.

3. The thermal conductive adhesive of the secondary battery of the present application can adopt coating process and is coated on the position of the cell for placing the safety component so as to adhere the safety component with the battery, thereby achieve quantified, positioned adhesive distribution, moreover, the viscosity of the thermal conductive adhesive of the present application increases production efficiency, the consecutive production process is reliable and meets the production process requirements.

The present application will be further illustrated as follows in combination with specific embodiments. It should be understood that, these embodiments are only used to illustrate the present application, rather than limiting the scope of the present application.

DESCRIPTION OF EMBODIMENTS

The present application relates to a secondary battery, including a cell, a safety component fixed on the cell and thermal conductive adhesive provided between the cell and the safety component. The thermal conductive adhesive of the present application is mainly composed of base material and thermal conductive filling material, the base material is selected from at least one of hot melt adhesive, silica gel binder or epoxy resin binder. The safety component includes a circuit breaker, a positive temperature coefficient (Positive Temperature Coefficient, PTC) and a fuse.

As an improvement of the secondary battery of the present application, the thermal conductive filling material is selected from at least one of metal, metallic oxide, carbon material, nitride, carbide, silicon material.

As an improvement of the secondary battery of the present application, the metal is metal powder, which is selected from at least one of silver, copper or tin.

Preferably, the metallic oxide is selected from at least one of aluminium oxide, magnesium oxide, zinc oxide, titanium oxide, $SnO_y$, $0<y<=2$.

Preferably, the carbon material is selected from at least one of hard carbon, soft carbon, mesocarbon microbead, carbon nano tube, graphite, graphene.

Preferably, the nitride is selected from at least one of silicon nitride, aluminium nitride, boron nitride, titanium nitride.

Preferably, the carbide is selected from at least one of silicon carbide, tungsten carbide.

Preferably, the silicon material is selected from at least one of Si, $SiO_x$, $0<x<=2$.

The thermal conductive filling material of the present application can also be natural mineral containing the above compounds.

As an improvement of the secondary battery of the present application, the thermal conductive coefficient of the thermal conductive filling material is 1 W/mK~10000 W/mK (25° C.), preferably 20~6000 W/mK (25° C.), more preferably 20~5000 W/mK (25° C.). If the thermal conductive coefficient of the thermal conductive filling material is too small, then the thermal conductive performance of the thermal conductive adhesive will not be affected significantly, however, if too large amount needs to be filled, then the adhering property and mechanical property of the thermal conductive adhesive will be affected.

As an improvement of the secondary battery of the present application, particle size of the thermal conductive filling material is 1 nm~100 μm, the particle size in the present application refers to the median particle size of the filling material. Too large particle size will lead to insufficient filling degree of the thermal conductive filling material, thus the thermal conductivity is poor; too small particle size will lead to poor processability.

Or, the thermal conductive filling material contains thermal conductive filling material particle with particle size larger than 1 nm but smaller than 1 μm, and thermal conductive filling material particle with particle size larger than 1 μm but smaller than 50 μm, since selecting multiple particle sizes can increase the filling volume and improve thermal conducting effect.

As a thermal conductive filling material with uniform particle size, the particle size is preferably between 20 nm~10 μm.

As an improvement of the secondary battery of the present application, the thermal conductive filling material occupies 1%~99% weight of the thermal conductive adhesive, preferably 20%~75%. Filling too large amount will lead to poor adhering property, filling too small amount will not significantly improve the thermal conducting effect.

If a thermal conductive filling material with thermal conductive coefficient of 25 W/mK~500 W/mK, the weight occupied by the thermal conductive filling material in the thermal conductive adhesive is preferably 20%~70%.

If a thermal conductive filling material with thermal conductive coefficient of 1000 W/mK~5000 W/mK, the weight occupied by the thermal conductive filling material in the thermal conductive adhesive is preferably 1%~10%.

The hot melt adhesive in the present application is a plastic binder, of which the physical status changes with respect to temperature, but with chemical property unchanged.

As an improvement of the secondary battery of the present application, the hot melt adhesive in the thermal conductive adhesive is selected from at least one of EVA hot melt adhesive, polyamide hot melt adhesive, polyurethane hot melt adhesive, polyester hot melt adhesive, polyethylene hot melt adhesive, polyesteramide hot melt adhesive, styrene type thermoplastic elastomer, the polyurethane hot melt adhesive is selected from isocyanate polyurethane prepolymer, the styrene type thermoplastic elastomer is selected from styrene-butadiene-styrene block copolymer, styrene-isoprene-styrene block copolymer.

The silica gel binder is selected from silica gel, of which the structural formula is as shown in formula I:

$$\left[\begin{array}{c} R_1 \\ | \\ Si-O \\ | \\ O \\ | \\ R_2 \end{array}\right]_n \quad (I)$$

$R_1$ is selected from substituted or unsubstituted, straight or branched $C_{1-30}$ alkyl, or substituted or unsubstituted, straight or branched $C_{1\sim30}$ alkoxy, $R_2$ is selected from substituted or unsubstituted, straight or branched $C_{1\sim30}$ alkyl, n is an integer in the range of 10~100.

Preferably, $R_1$ is selected from substituted or unsubstituted straight or branched $C_{1\sim20}$ alkyl or substituted or unsubstituted, straight or branched $C_{1\sim20}$ alkoxy, $R_2$ is selected from substituted or unsubstituted, straight or branched $C_{1\sim20}$ alkyl, n is an integer in the range of 10~100.

For alkyl with 1~20 carbon atoms, the alkyl can be chainlike alkyl, or can be cyclic alkyl, the hydrogen on the loop of the cyclic alkyl can be replaced by alkyl, lower limit of the number of carbon atoms of the alkyl is preferably 2, 3, 4, 5, the upper limit thereof is preferably 3, 4, 5, 6, 8, 10, 12, 14, 16, 18. Preferably, alkyl with 1~10 carbon atoms is selected, more preferably, chainlike alkyl with 1~6 carbon atoms and cyclic alkyl with 3~8 carbon atoms are selected, furthermore preferably, chainlike alkyl with 1~4 carbon atoms and cyclic alkyl with 5~7 carbon atoms are selected. Examples of alkyl can be such as methyl, ethyl, n-propyl, isopropyl, n-butyl, isobutyl, sec-butyl, tert-butyl, n-amyl, isoamyl, neo-amyl, hexyl, 2-methyl-amyl, 3-methyl-amyl, 1,1,2-trimethyl-propyl, 3,3,-dimethyl-butyl, heptyl, 2-heptyl, 3-heptyl, 2-methyl hexyl, 3-methyl hexyl, isoheptyl, octyl, nonyl, decyl.

For alkoxy with 1~20 carbon atoms, lower limit of the number of carbon atoms in the alkoxy is preferably 2, 3, 4, 5, the upper limit thereof is preferably 3, 4, 5, 6, 8, 10, 12, 14, 16, 18. Preferably, alkoxy with 1~10 carbon atoms is selected, more preferably, alkoxy with 1~6 carbon atoms is selected, furthermore preferably, alkoxy with 1~4 carbon atoms is selected. Examples of alkoxy can be such as methoxy, ethoxy, n-propoxy, isopropoxy, n-butoxy, sec-butoxy, tert-butoxy, n-amoxy, iso-amoxy, cyclopentoxy, cyclohexoxy.

The epoxy resin binder in the present application contains epoxy resin, which refers to organic compound with two or more epoxy groups contained in a molecule. The molecule structure of the epoxy resin contains active epoxy group, the epoxy group is located at the end or in the middle of the molecule chain or formed as a ring shaped structure. The epoxy resin can perform cross-linking reaction with a plurality types of curing agents to form an insoluble high polymer with a three dimensional net shaped structure.

Structural formula of the epoxy resin adopted by the present application is selected from but not limited to the following structural formulas:

(Formula 1)

(Formula 2)

(Formula 3)

The epoxy resin binder also contains at least one of curing agent, accelerant, flexibilizer, coupling agent, filling material.

The content of the curing agent is 0.01~90 wt %, the content of the accelerant is 0.01~90 wt %, the content of the flexibilizer is 0.01~90 wt %, the content of the coupling agent is 0.01~90 wt %, the content of the filling material is 0.01~99 wt %. Specific content can be determined according to the performance requirement on the epoxy resin binder.

The hot melt adhesive is selected from at least one of EVA (ethylene-vinyl acetate copolymer) hot melt adhesive, polyamide hot melt adhesive, polyurethane hot melt adhesive, polyester hot melt adhesive, polyethylene hot melt adhesive, polyesteramide hot melt adhesive, styrene type thermoplastic elastomer.

The ethylene-vinyl acetate copolymer (also called as ethylene-acetic acid ethylene copolymer) is copolymerized by ethylene (E) and vinyl acetate (VA), abbreviated as EVA. In the present application, in order to guarantee adhering property or other properties of the thermal conductive adhesive, ethylene-vinyl acetate copolymer with vinyl acetate (VA) content of 30% is adopted.

The polyamide (PA) in the present application is a general term for a high polymer containing amide group in the repeating unit of its macromolecule main chain. The polyamide can be prepared by open loop polymerizing of acid amide, or can be prepared by polycondensation of diamine and diacid, and so on. PA possesses good overall property, including mechanical property, heat resistant property, wear-resisting property, chemical drug tolerant property and self-lubricating property. There are multiple kinds of PA, including PA6, PA66, PA11, PA12, PA46, PA610, PA612, PA1010 etc. In order to adapt for the adhering property of the thermal conductive adhesive of the present application, PA12 is preferred.

The polyurethane of the present application is a general term of a macromolecular compound containing a repeating carbamate group in its main chain, which is formed by addition polymerization of organic diisocyanate or polyisocyanate with dihydroxyl or polyhydroxy-compound.

The polyethylene (PE) hot melt adhesive in the present application includes HDPE hot melt adhesive and LDPE hot melt adhesive. HDPE powder hot melt adhesive is a nonpolar thermoplastic resin with high crystallinity, LDPE powder hot melt adhesive has low melting temperature and good fluidity after melting.

The polyesteramide in the present application is a polymer containing ester bond and amido bond in its molecular chain, which combines the advantages of polyester and polyamide, and includes linear polyesteramide and cross-linking polyesteramide. The present application preferably adopts cross-linking polyesteramide as the hot melt adhesive.

The polyester resin used by the hot melt adhesive of the present application is a thermoplastic product formed by esterification of diacid and dihydric alcohol. Generally, dimethyl terephthalate, isophthalic acid, ethylene glycol and butanediol etc are adopted as raw material of the esterification. Similar to polyamide hot melt adhesive, polyester hot melt adhesive has high heat resistance, good waterproof property and elasticity. The polyester hot melt adhesive is preferably polyether sulfone resin.

In the above hot melt adhesive, the polyurethane hot melt adhesive is preferably isocyanate polyurethane prepolymer, the polymerization reaction formula is:

carbamate

During the adhering process of the isocyanate polyurethane prepolymer, the solid adhesive is heated to melt as fluid, and then is coated on the surface of the base material, the active end group —NCO group reacts with the active hydrogen in the water absorbed by the surface of the base material, in the air and within the hydroxyl existed on the surface thereof, to form a polyurea structure. The polyurethane binder performs high activity and polarity, and also performs excellent chemical adhesion with base material containing active hydrogen such as porous material like foam, plastic, wood, leather, fabric, paper and ceramic etc, and material having smooth and clean surface such as metal, glass, rubber, plastic etc, which makes the such thermal conductive adhesive fixedly adhere the protection device with the battery.

Figure 1:
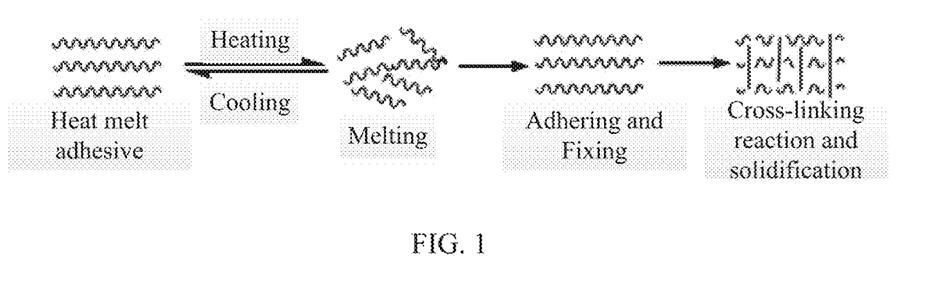
FIG. 1 shows a principle diagram of a hot melt adhesive during solidification and adhesion.
Figure 4A:
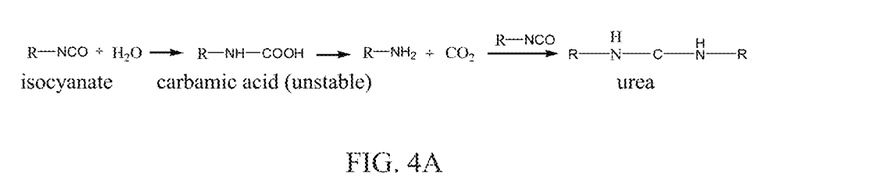
FIG. 4A shows the self-crosslinking reaction of the thermal conductive adhesive.
Figure 4B:
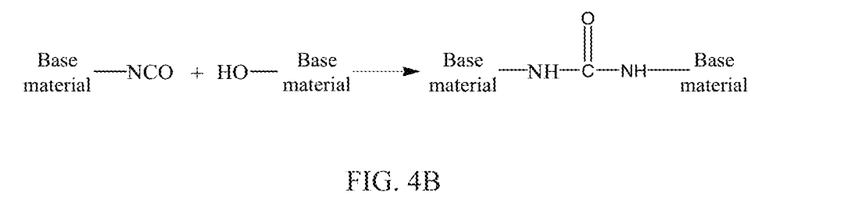
FIG. 4B shows the reaction between the thermal conductive adhesive and the base material.

The principle diagram during solidification and adhesion of the hot melt adhesive is as shown in FIG. 1. The reaction of the isocyanate polyurethane prepolymer during solidification and adhesion is shown in FIGS. 4A-4B. FIG. 4A shows the self-crosslinking reaction of the thermal conductive adhesive. FIG. 4B shows the reaction between the thermal conductive adhesive and the base material.

Compound of isocyanate polyurethane prepolymer with isocyanate group can be selected from: toluene diisocyanate, polymethylene polyphenyl isocyanate, 1,6-hexamethylene diisocyanate, diphenylmethane 4, 4'-diisocyanate, toluene diisocynate etc; compound of the isocyanate polyurethane prepolymer with hydroxyl group can be selected from: polypropylene oxide glycol, poly(ethylene glycol adipate) diol, poly(ethylene-diethylene glycol adipate) diol, poly(ethylene-glycol-propanediol adipate) diol, poly(ethylene glycol adipate) diol.

The styrene series thermoplastic elastomer is selected from styrene-butadiene-styrene block copolymer (SBS), styrene-isoprene-styrene block copolymer (SIS).

As an improvement of the secondary battery of the present application, the thermal conductive adhesive can further be added with at least one of tackifier, antioxidant, catalyst, viscosity modifier, so as to adjust the performance of the thermal conductive adhesive.

As an improvement of the secondary battery of the present application, melt viscosity of the thermal conductive adhesive is 1000~1*10$^6$ CPs (175° C.), initial viscosity is 0.5~100N, peeling strength is 0.1~20N/3 mm, melting temperature is 120° C.~190° C., thermal conductive coefficient is 0.1~100 W/mK (25° C.).

Preferably, the melt viscosity of the thermal conductive adhesive is 1000~20000 CPs (175° C.), the initial viscosity is 0.5~60N, peeling strength is 0.5~10N/3 mm, melting temperature is 150° C.~190° C., thermal conductive coefficient is 0.1~50 W/mK (25° C.).

More preferably, the thermal conductive coefficient of the thermal conductive adhesive is 0.2~50 W/mK (25° C.).

The preparing method of the thermal conductive adhesive of the present application is: in water-free inert gas environment, adding thermal conductive filling material after heating the raw material, stirring the mixture to be dispersed and uniform, then sealing.

As an improvement of the secondary battery of the present application, the area of the thermal conductive adhesive is 1 mm$^2$~500 mm$^2$, the thickness of the thermal conductive adhesive is 0.05~5 mm.

The preparing method of the secondary battery according to the present application is: adding thermal conductive adhesive on the safety component or the cell, applying a force of 0.1~100N so that the safety component tightly adheres to the cell. Preferably, the operating temperature of the thermal conductive adhesive is 150~200° C.

The adding manner of the thermal conductive adhesive in the present application can be coating, depositing, adhering, placing etc; the coating manner can be achieved by dotting, coating line, spraying etc.

The isocyanate polyurethane prepolymer, silica gel, epoxy resin used in the embodiments of the present application are purchased from Guangzhou Yawei company.

The ethylene-vinyl acetate copolymer (EVA), polyamide (PA), low density polyethylene (LDPE), polyesteramide (PEA) used in the embodiments of the present application are purchased from Huagongbaichuan company.

The double faced adhesive tape 3M467, thermal conductive double faced adhesive tape 3M8805 used in the embodiments of the present application are purchased from 3M company.

The high density polyethylene (HDPE), styrene-butadiene-styrene block copolymer (SBS), styrene-isoprene-styrene block copolymer (SIS) used in the embodiments of the present application are purchased from Shenzhen Suyuanshiye Co, Ltd.

Embodiments 1~9

Preparing thermal conductive adhesive according to the hot melt adhesive and electrical conductive filling material shown in Table 1, and coating the prepared thermal conductive adhesive between the cell and the safety component, detecting the performance of the cell.

The preparing method of the thermal conductive adhesive: in water-free inert gas environment, adding thermal conductive filling material after heating the raw material, stirring the mixture to be dispersed and uniform, then sealing.

The preparing method of the battery is: adding thermal conductive adhesive on the safety component or the cell, applying a force of 0.1~100N so that the safety component is tightly adhered with the cell. Preferably, the operating temperature of the thermal conductive adhesive is 150~200° C.

TABLE 1

| No. | Hot melt adhesive | Thermal conductive filling material | | | |
|---|---|---|---|---|---|
| | | Type | Weight ratio (%) | Particle size (nm) | Thermal conductive coefficient (W/mK) |
| Embodiment 1 | polypropylene oxide glycol, toluene diisocynate | aluminium oxide | 50% | 500 | 30 |
| Embodiment 2 | polymethylene polyphenyl isocyanate, poly(ethylene glycol adipate) diol | graphite | 50% | 500 | 151 |
| Embodiment 3 | 1,6-hexamethylene diisocyanate, poly(ethylene-diethylene glycol adipate) diol | SiC | 50% | 500 | 83 |
| Embodiment 4 | diphenylmethane 4,4'-diisocyanate, poly(ethylene-glycol-propanediol adipate) diol | Silver powder | 20% | 500 | 420 |
| Embodiment 5 | toluene diisocyanate, poly(ethylene glycol adipate) diol | aluminium oxide | 65% | 400 | 30 |
| Embodiment 6 | EVA (VA 30 wt %) | aluminium oxide | 50% | 500 | 30 |
| Embodiment 7 | PA12 | aluminium oxide | 50% | 500 | 30 |
| Embodiment 8 | LDPE | aluminium oxide | 50% | 500 | 30 |
| Embodiment 9 | PEA | aluminium oxide | 50% | 500 | 30 |
| Comparison example 1 | Double faced adhesive tape 3M467 | — | — | — | — |
| Comparison example 2 | — | — | — | — | — |
| Comparison example 3 | Thermal conductive double faced adhesive tape 3M8805 | — | — | — | — |

The performance of the thermal conductive adhesive in Embodiments 1~9 and Comparison examples 1~3 is as shown in Table 2:

TABLE 2

| No. | Melt viscosity/CPs | Operating temperature/°C | Initial viscosity/N | Setting time/h | Peeling strength N/3 mm | Thermal conductive coefficient of thermal conductive adhesive/ W/mK |
|---|---|---|---|---|---|---|
| Embodiment 1 | 6000 | 170 | 50 | 18 | 8 | 1.1 |
| Embodiment 2 | 5000 | 180 | 60 | 20 | 7 | 1.5 |
| Embodiment 3 | 5500 | 180 | 50 | 24 | 8.4 | 1.4 |
| Embodiment 4 | 5000 | 175 | 45 | 20 | 7.9 | 2.5 |
| Embodiment 5 | 6500 | 180 | 45 | 20 | 7.5 | 1.6 |
| Embodiment 6 | 4800 | 180 | 60 | 10 | 10 | 1.1 |
| Embodiment 7 | 5000 | 190 | 55 | 12 | 9 | 1.4 |
| Embodiment 8 | 4400 | 185 | 45 | 10 | 7 | 1.2 |
| Embodiment 9 | 4500 | 175 | 40 | 8 | 6 | 1.1 |
| Comparison example 1 | — | — | 8 | — | 2 | 0.12 |
| Comparison example 2 | — | — | — | — | — | — |
| Comparison example 3 | — | — | 5 | — | 2 | 0.7 |

The detection method includes:

(i) initial viscosity testing method: preparing sample product with 0.03 mg/mm dispensing adhesive, cutting a sample product of 3 mm*20 mm, cementing TCO after dispensing adhesive, and testing tension under normal temperature within 2 minutes after completion of the sample product.

(ii) peeling strength testing method: preparing adhering sample product with 0.06 mg/mm dispensing adhesive, cutting a sample product with 3 mm width, cementing TCO after dispensing adhesive, then testing to acquire performance of the battery by peeling at 180° C.

Figure 2:
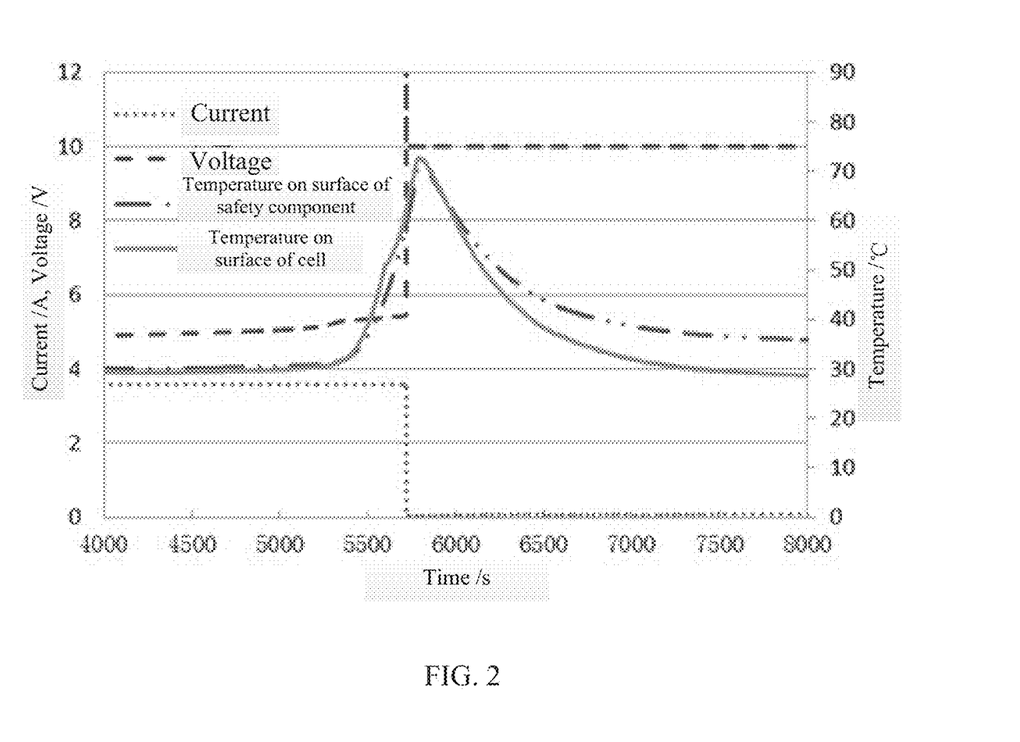
FIG. 2 shows variation curves of temperature, voltage and current with respect to time and temperature during overcharging according to Embodiment 1.
Figure 3:
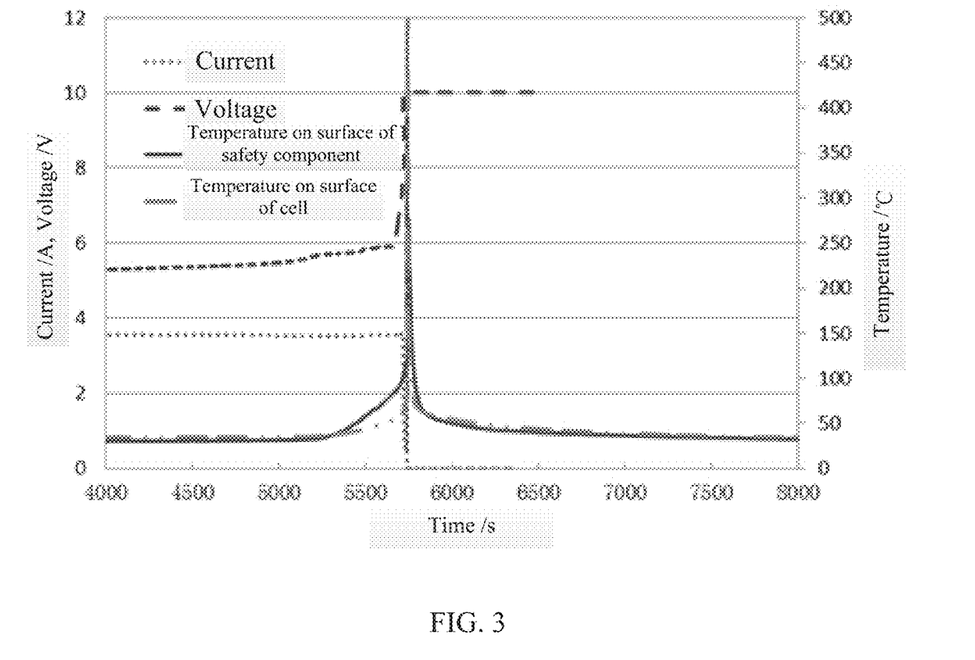
FIG. 3 shows variation curves of temperature, voltage and current with respect to time and temperature during overcharging according to Comparison Example 2.

(iii) overcharge testing method: charging using a constant current of 1 C to a voltage of 10V, then stopping testing after maintaining CV as 10V for 2 h or until the temperature of the cell is below 40° C. Variation curves of temperature, voltage and current at different time and under different temperature of Embodiment 1 and Comparison example 2 are shown in FIG. 2 and FIG. 3, respectively.

The performance of the battery acquired by testing is as shown in Table 3:

TABLE 3

| No. | Safety component cut off or not | Testing result of battery overcharge | Highest temperature on surface of safety component/°C | Highest temperature on surface of cell/°C |
|---|---|---|---|---|
| Embodiment 1 | Yes | Nonignition | 80 | 80 |
| Embodiment 2 | Yes | Nonignition | 82 | 85 |
| Embodiment 3 | Yes | Nonignition | 75 | 76 |
| Embodiment 4 | Yes | Nonignition | 86 | 87 |
| Embodiment 5 | Yes | Nonignition | 74 | 76 |

TABLE 3-continued

| No. | Safety component cut off or not | Testing result of battery overcharge | Highest temperature on surface of safety component/° C. | Highest temperature on surface of cell/° C. |
|---|---|---|---|---|
| Embodiment 6 | Yes | Nonignition | 79 | 80 |
| Embodiment 7 | Yes | Nonignition | 78 | 78 |
| Embodiment 8 | Yes | Nonignition | 87 | 88 |
| Embodiment 9 | Yes | Nonignition | 89 | 90 |
| Comparison example 1 | No | Ignition | 600 | 580 |
| Comparison example 2 | None | Ignition | — | 850 |
| Comparison example 3 | Yes | Nonignition | 80 | 94 |

Embodiment 2

Preparing thermal conductive adhesive according to the hot melt adhesive and thermal conductive filling material shown in Table 4, and coating the prepared thermal conductive adhesive between the cell and the safety component, detecting the performance of the cell. The preparing method is as the same with Embodiment 1.

TABLE 4

| | | Thermal conductive filling material | | | |
|---|---|---|---|---|---|
| No. | Hot melt adhesive | Type | weight ratio (%) | Particle size | Thermal conductive coefficient (W/mK) |
| Embodiment 10 | HDPE | graphene | 1% | 10 nm | 4800 |
| Embodiment 11 | SBS | mesocarbon microbead | 50% | 100 nm | 200 |
| Embodiment 12 | SIS | carbon nano tube | 5% | 50 nm | 1500 |
| Embodiment 13 | EVA (VA 30 wt %) | $SnO_2$ | 20% | 6 μm | 30 |
| Embodiment 14 | EVA (VA 30 wt %) | Si | 65% | 400 nm | 100 |
| Embodiment 15 | Silica gel | silicon nitride | 50% | 4 μm | 200 |
| Embodiment 16 | Silica gel | aluminium oxide | 50% | 5 μm | 30 |
| Embodiment 17 | Epoxy resin: formula 1 | magnesium oxide | 50% | 5 μm | 36 |
| Embodiment 18 | Epoxy resin: formula 2 | hard carbon | 20% | 5 μm | 50 |
| Embodiment 19 | Epoxy resin: formula 3 | soft carbon | 65% | 5 μm | 20 |
| Embodiment 20 | Epoxy resin: formula 1 | silicon carbide | 50% | 5 μm | 83 |
| Embodiment 21 | polypropylene oxide glycol, toluene diisocynate | zinc oxide | 20% | 3 μm | 26 |
| Embodiment 22 | polymethylene polyphenyl isocyanate, poly(ethylene glycol adipate) diol | aluminium nitride | 30% | 6 μm | 30 |
| Embodiment 23 | 1,6-hexamethylene diisocyanate, poly(ethylene-diethylene glycol adipate) diol | boron nitride | 40% | 3 μm | 125 |
| Embodiment 24 | diphenylmethane 4,4'-diisocyanate, poly(ethylene glycol adipate) diol | titanium nitride | 50% | 4 μm | 29 |
| Embodiment 25 | EVA (VA 30 wt %) | $SiO_2$ | 60% | 15 μm | 5 |
| Embodiment 26 | polypropylene oxide glycol, toluene diisocynate | aluminium oxide | 50% | 6 μm 25% 800 nm 25% | 30 |
| Embodiment 27 | polyester hot melt adhesive | zinc oxide | 50% | 3 μm 25% 500 nm 25% | 26 |
| Embodiment 28 | 1,6-hexamethylene diisocyanate, poly(ethylene-diethylene glycol adipate) diol | Si | 50% | 20 μm | 100 |
| Embodiment 29 | diphenylmethane 4,4'-diisocyanate, poly(ethylene-glycol-propanediol adipate) diol | Si | 50% | 50 μm | 100 |
| Embodiment 30 | toluene diisocynate, poly(ethylene glycol adipate) diol | Si | 50% | 100 μm | 100 |

The performance of the thermal conductive adhesive in Embodiments 10~30 is as shown in Table 5:

TABLE 5

| No. | Melt viscosity/CPs | Operating temperature/° C. | Initial viscosity/N | Setting time/h | Peeling strength N/3 mm | Thermal conductive coefficient of thermal conductive adhesive/ W/mK |
|---|---|---|---|---|---|---|
| Embodiment 10 | 6500 | 170 | 45 | 12 | 6 | 3.5 |
| Embodiment 11 | 5500 | 180 | 50 | 13 | 6.5 | 2.4 |
| Embodiment 12 | 5500 | 180 | 42 | 15 | 7 | 1.5 |
| Embodiment 13 | 4800 | 185 | 45 | 13 | 8 | 0.9 |
| Embodiment 14 | 7000 | 170 | 35 | 12 | 5.5 | 1.9 |
| Embodiment 15 | 6000 | 180 | 40 | 18 | 7 | 2.5 |
| Embodiment 16 | 6200 | 180 | 42 | 18 | 8 | 1.8 |
| Embodiment 17 | 1000 | 25 | 0.5 | 72 | 7 | 0.9 |
| Embodiment 18 | 800 | 25 | 0.6 | 72 | 6.8 | 0.6 |
| Embodiment 19 | 1200 | 25 | 0.5 | 72 | 7 | 0.9 |
| Embodiment 20 | 1300 | 25 | 0.4 | 72 | 6 | 1.5 |
| Embodiment 21 | 4500 | 175 | 45 | 14 | 6.5 | 0.5 |
| Embodiment 22 | 4700 | 175 | 40 | 16 | 6 | 0.8 |
| Embodiment 23 | 5000 | 175 | 40 | 16 | 5.8 | 1.6 |
| Embodiment 24 | 5500 | 175 | 35 | 18 | 5 | 0.9 |
| Embodiment 25 | 5500 | 180 | 30 | 16 | 5 | 0.25 |
| Embodiment 26 | 5500 | 180 | 30 | 16 | 8 | 2.1 |
| Embodiment 27 | 6000 | 180 | 28 | 12 | 4 | 0.4 |
| Embodiment 28 | 6500 | 180 | 16 | 18 | 4 | 1.2 |
| Embodiment 29 | 5800 | 180 | 14 | 16 | 3.5 | 0.9 |
| Embodiment 30 | 5000 | 180 | 9 | 12 | 1 | 0.6 |

The performance of the battery acquired by testing is as shown in Table 6:

TABLE 6

| No. | Safety component cut off or not | Testing result of battery overcharge | Highest temperature on surface of safety component/° C. | Highest temperature on surface of cell/° C. |
|---|---|---|---|---|
| Embodiment 10 | Yes | Nonignition | 75 | 75 |
| Embodiment 11 | Yes | Nonignition | 76 | 77 |
| Embodiment 12 | Yes | Nonignition | 77 | 81 |
| Embodiment 13 | Yes | Nonignition | 76 | 89 |
| Embodiment 14 | Yes | Nonignition | 77 | 79 |
| Embodiment 15 | Yes | Nonignition | 75 | 79 |
| Embodiment 16 | Yes | Nonignition | 78 | 80 |
| Embodiment 17 | Yes | Nonignition | 78 | 92 |
| Embodiment 18 | Yes | Nonignition | 76 | 98 |
| Embodiment 19 | Yes | Nonignition | 77 | 94 |
| Embodiment 20 | Yes | Nonignition | 76 | 79 |
| Embodiment 21 | Yes | Nonignition | 77 | 85 |
| Embodiment 22 | Yes | Nonignition | 76 | 82 |
| Embodiment 23 | Yes | Nonignition | 75 | 77 |
| Embodiment 24 | Yes | Nonignition | 76 | 83 |
| Embodiment 25 | Yes | Nonignition | 76 | 92 |
| Embodiment 26 | Yes | Nonignition | 74 | 75 |
| Embodiment 27 | Yes | Nonignition | 78 | 86 |
| Embodiment 28 | Yes | Nonignition | 78 | 92 |
| Embodiment 29 | Yes | Nonignition | 79 | 95 |
| Embodiment 30 | Yes | Nonignition | 82 | 104 |

Comparison Examples 4~9

Preparing thermal conductive adhesive according to the hot melt adhesive and electrical conductive filling material shown in Table 7, and coating the prepared thermal conductive adhesive between the cell and the safety component, detecting the performance of the cell. The preparing method is as the same with Embodiment 1.

TABLE 7

| | Hot melt adhesive | Thermal conductive filling material | | | |
|---|---|---|---|---|---|
| | | Type | Weight ratio (%) | Particle size | Thermal conductive coefficient (W/mK) |
| Comparison example 4 | polypropylene oxide glycol and toluene diisocynate | aluminium oxide | 50% | 110 μm | 30 |
| Comparison example 5 | polypropylene oxide glycol and toluene diisocynate | ABS | 50% | 5 μm | 0.25 |
| Comparison example 6 | polypropylene oxide glycol and toluene diisocynate | — | — | — | — |
| Comparison example 7 | polypropylene oxide glycol and toluene diisocynate | aluminium oxide | 1% | 5 μm | 30 |
| Comparison example 8 | polypropylene oxide glycol and toluene diisocynate | aluminium oxide | 80% | 5 μm | 30 |
| Comparison example 9 | polypropylene oxide glycol and toluene diisocynate | aluminium oxide | 95% | 5 μm | 30 |

The performance of the thermal conductive adhesive and the battery prepared by the thermal conductive adhesive of Comparison examples 4~9 is as shown in Table 8 and Table 9:

TABLE 8

| | Melt viscosity/CPs | Operating temperature/° C. | Initial viscosity/N | Setting time/h | Peeling strength N/3 mm | Thermal conductive coefficient/ W/mK |
|---|---|---|---|---|---|---|
| Comparison example 4 | 7000 | 180 | 10 | 16 | 3 | 1.1 |
| Comparison example 5 | 5500 | 175 | 30 | 12 | 6 | 0.3 |
| Comparison example 6 | 4000 | 175 | 50 | 14 | 12 | 0.08 |
| Comparison example 7 | 4300 | 180 | 50 | 16 | 10 | 0.4 |
| Comparison example 8 | 4400 | 180 | 48 | 15 | 9.8 | 0.5 |
| Comparison example 9 | 8000 | 180 | 10 | 8 | 2 | 2.8 |

TABLE 9

| | Safety component cut off or not | Testing result of battery overcharge | Highest temperature on surface of safety component/° C. | Highest temperature on surface of cell/° C. |
|---|---|---|---|---|
| Comparison example 4 | Yes | Nonignition | 79 | 102 |
| Comparison example 5 | No | Ignition | 520 | 580 |
| Comparison example 6 | No | Ignition | 630 | 700 |
| Comparison example 7 | Yes | Nonignition | 79 | 86 |
| Comparison example 8 | Yes | Nonignition | 75 | 76 |
| Comparison example 9 | No (fall off) | Ignition | 600 | 750 |

The experiment result of Comparison example 4 shows that if the particle size of the thermal conductive filling material is too large, the thermal conductive coefficient decreases.

The experiment results of Comparison examples 5 and 6 show that if the thermal conductive filling material is not added, or filling material with relative low thermal conductive coefficient is added, the thermal conductivity of the prepared thermal conductive adhesive cannot be effectively improved;

The experiment results of Comparison examples 7~9 show that with thermal conductive filling material of moderate thermal conductivity added, if too much is added, the physical property of the thermal conductive adhesive will be affected due to poor adhesion, thereby cannot form a stable connection with the battery and the safety component.

Although the present application is illustrated by the preferred embodiments as above, however, they are not used to limit the claims; various modifications and variations can be made by those skilled in the art without departing from the concept of the present application, therefore, the protection scope of the present application shall be defined by the scope of the claims.

What is claimed is:

1. A secondary battery, comprising a cell, a safety component fixed on the cell and thermal conductive adhesive provided between the cell and the safety component, wherein, the thermal conductive adhesive comprises:
   an isocyanate polyurethane prepolymer and aluminum oxide,
   wherein, the thermal conductive adhesive further comprises at least one of a tackifier or an antioxygen.

2. The secondary battery according to claim 1, wherein, a particle diameter of the aluminum oxide is 1 nm to 100 μm.

3. The secondary battery according to claim 1, wherein the thermal conductive adhesive comprises 1% to 99% aluminum oxide by weight.

4. The secondary battery according to claim 1, wherein, the thermal conductive adhesive has a melt viscosity of $1 \cdot 10^3$ to $1 \cdot 10^6$ CPs, an initial viscosity of 0.5 to 100N, a peeling strength of 0.1 to 20N/3 mm, a melting temperature of 120 to 190° C., and a thermal conductive coefficient of 0.1 to 100 W/mK.

5. The secondary battery according to claim 1, wherein an area of the thermal conductive adhesive is 1 $mm^2$ to 500 $mm^2$, and a thickness of the thermal conductive adhesive is 0.01 mm to 10 mm.

6. A method for preparing the secondary battery according to claim 1, comprising the steps of:
   adding the thermal conductive adhesive on the safety component or the cell, wherein the thermal conductive adhesive comprises the isocyanate polyurethane prepolymer and the aluminum oxide, and, applying a force of 0.1 to 100N to the safety component, so that the safety component is adhered to the cell.

7. The secondary battery according to claim 1, wherein the thermal conductive adhesive comprises 20% to 75% aluminum oxide by weight.

8. The secondary battery according to claim 1, wherein the thermal conductive adhesive has a melt viscosity of 1000 to 20000 CPs, an initial viscosity of 0.5 to 60N, a peeling strength of 0.5 to 10N/3 mm, a melting temperature of 150° C. to 190° C., and a thermal conductive coefficient of 0.1 to 100 W/mK.

* * * * *